United States Patent [19]
Follett

[11] 3,850,189
[45] Nov. 26, 1974

[54] SAFETY VALVE HAVING SEALED RESET MEANS

[75] Inventor: John L. Follett, Fair Haven, N.Y.

[73] Assignee: Follett Valves, Inc., Fair Haven, N.Y.

[22] Filed: May 30, 1972

[21] Appl. No.: 257,655

[52] U.S. Cl............... 137/39, 137/75, 137/460, 137/614.14, 251/65, 277/DIG. 6, 277/233
[51] Int. Cl. ... F16k 17/28, F16k 17/36, F16k 17/38
[58] Field of Search ........ 137/66, 456, 460, 614.13, 137/614.14, 39; 277/188, 233, DIG. 6; 431/54

[56] References Cited
UNITED STATES PATENTS

| | | | |
|---|---|---|---|
| 2,409,947 | 10/1946 | Mantz | 137/66 |
| 2,901,034 | 8/1959 | Puttfarcken | 137/66 X |
| 3,407,827 | 10/1968 | Follett | 137/39 |

FOREIGN PATENTS OR APPLICATIONS
352,644  4/1961  Switzerland........................... 431/54

OTHER PUBLICATIONS

W. H. Lehmberg. "Plain and Laminated Felt Seals Their Design and Application." In Product Engineering, pp. 209–211. March 1946. TJ1.P93.

Primary Examiner—William R. Cline
Assistant Examiner—Richard Gerard
Attorney, Agent, or Firm—Charles S. McGuire

[57] ABSTRACT

A safety valve having a pallet movable to close the valve in response to an unsafe condition with manually operable reset means for moving the pallet back to the open position while preventing fluid escape through the valve by means of a unique washer arrangement around the reset rod.

6 Claims, 6 Drawing Figures

PATENTED NOV 26 1974 3,850,189

SAFETY VALVE HAVING SEALED RESET MEANS

BACKGROUND OF THE INVENTION

This invention relates to valves in general and more particularly to an improved shut-off valve.

In U.S. Pat. No. 3,407,827 granted to me on Oct. 29, 1968, there is disclosed an automatic shut-off valve which uses a valve element or pallet such as a metal ball and a magnetic seat to shut off the flow of fluid when the valve is tipped, when excessive vibrations occur or when excessive fluid flow occurs. As more fully disclosed therein, this valve is particularly useful with portable heating units to prevent fires if the heater is tipped over or if the supply line is broken between the valve and the heater.

The improved valve of the present invention offers two advantages over the valve of the aforementioned patent. The first of these concerns the possible danger of fluid leakage through the valve when resetting the ball. If the valve has closed because of excess fluid flow, then while the ball is being reset by holding it away from the magnet, fluid will flow freely. As soon as the reset is removed, it will reclose. But, in the meantime, a large quantity of gas may have escaped from the broken line creating a dangerous condition.

The second improvement concerns means for causing automatic shut-off when overheating occurs. In some applications, the first sign of an abnormal condition is an increase in temperature. Thus, an automatic shut-off valve, to provide full protection, must also be sensitive to heat.

SUMMARY

The reset system of the present invention provides positive sealing during resetting to avoid the first problem through a double spring and gasket arrangement and solves the second problem with a spring loaded activator imbedded in solder, or other malleable material which softens at a predetermined low temperature, which will push the metal pallet toward the seat when a temperature which softens the material is reached.

Thus, it is an object of this invention to provide a novel and improved reset mechanism for use with an automatic shut-off valve which uses a metal element and magnetic seat.

Another object is to provide such a mechanism using a double spring and gasket arrangement.

A further object is to provide such a valve with a heat sensitive activating means.

It is also an object to provide a heat sensitive valve closure means which is held cocked by embedding a spring loaded stem in cold solder, or the like, and will release when the solder softens.

FIGURE DESCRIPTIONS

DETAILED DESCRIPTION OF THE PREFERRED EMBODIMENTS

Figure 1:
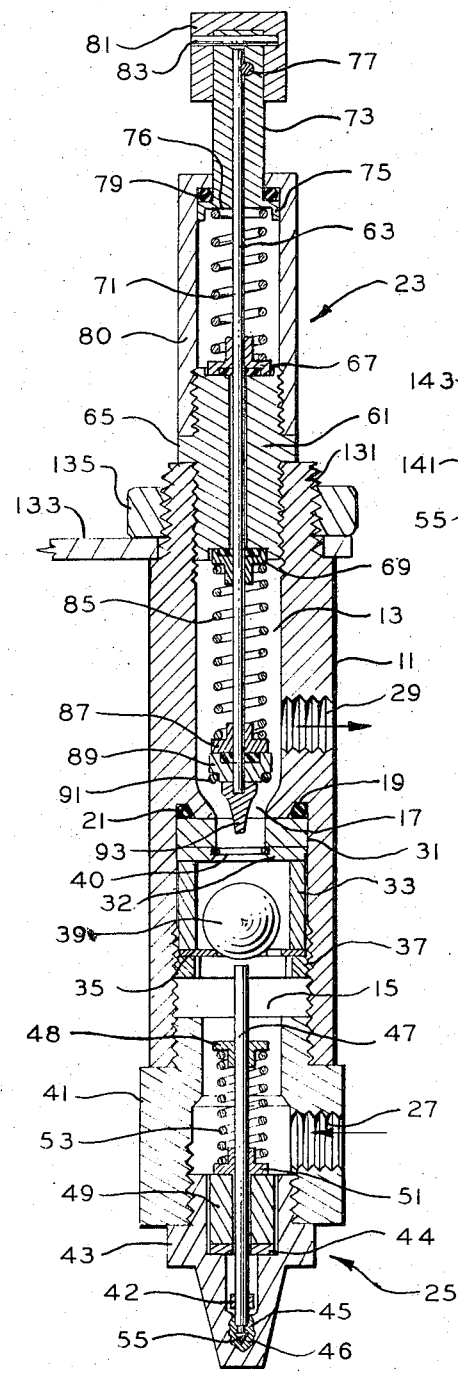
FIG. 1 is a cross sectional view of a first embodiment of the invention.

In FIG. 1 the main body of the valve is identified by the numeral 11. The body is essentially cylindrical with an upper chamber 13 and lower chamber 15. Chamber 13 ends at a throat portion 17 where it meets lower chamber 15. At the top of chamber 15 is an annular recess 19 in which a sealing gasket 21 is placed. It will be noted that the inner edge of recess 19 is beveled so that gasket 21 will not be cut when forced into place. The top of chamber 13 and the bottom of chamber 15 each contain internal threads for connecting the reset apparatus, indicated generally by numeral 23, and the heat sensitive apparatus, indicated generally by numeral 25, each of which will be described below.

The fluid inlet is to the lower chamber through inlet 27 in apparatus 25 and the outlet through an opening 29 in upper chamber 13, to which opening an outlet pipe may be attached in conventional fashion. The magnetic valve seat 31 and cooperative retaining ring 32 are placed inside the lower chamber and will compress gasket 21. Holding seat 31 and ring 32 in place is a hollow cylindrical member 33, which in turn is supported by washer type member 35, shown in detail in FIG. 2, and nut 37 having external threads. Apparatus 25 is screwed into the lower end of body 11 leaving a space to allow adjustment of nut 37 which may be provided with slots for insertion of a wrench from below with apparatus 25 removed.

The metal ball 39 rests on member 35, which includes a central cutout shaped to allow fluid flow around the ball when the valve is in a normal upright position. Although shown of a particular shape in FIGS. 1 and 2 the cutout may be triangular or of another suitable shape. In some instances member 35 may be flat with a circular hole for ball 39, in which case it can be so adjusted that the normal flow will raise ball 39 a sufficient distance to maintain proper function. In such application, if there should be a back pressure for some undesirable reason, member 35 becomes a seat, creating a two-way valve which prevents excess flow in either direction. Valve sensitivity may also be adjusted by changing the length of sleeve 33 which changes the degree of magnetic attraction exerted by magnetic seat 31 on ball 39 in the normal, open position. If excessive flow does occur, the ball will move, be attracted by the magnetic force of seat 31 and close the valve. Likewise, if the valve is tipped or if vibration causes the ball 39 to move, it will be attracted to the seat 31. An O-ring seal 40 is inserted in a recess between magnetic seat 31 and ring 32 to avoid metal to metal contact. Normally, ball 39 will close the valve by contacting this seal. However, if O-ring 40 is destroyed by heat or other means, a metal to metal seal will result between seat 31 and ball 39. It should also be noted that ball 39 may be magnetic and seat 31 of a ferrous metal. Likewise, ball 39 may be replaced by a properly guided pallet of other than spherical configuration, in which case the O-ring may be placed on either the pallet or the seat. Rather than making the seat in one piece, the provision of ring 32, essentially in the form of a washer, allows O-ring 40 to be retained without expensive machining of a groove within magnet 31.

The operation thus far is essentially the same as that described in my above-referenced patent. However, the addition of apparatus 25 makes the valve also sensitive to heat. In the FIG. 1 embodiment, the body of apparatus 25 is provided in two parts 41 and 43, inlet opening 27 being provided in upper part 41. Lower part 43 is threaded into the upper part which, in turn, is threaded into the lower end of chamber 15 of main body portion 11. Lower part 43 of apparatus 25 is provided with an internal, axial opening which may be of uniform or graduated diameter. The FIG. 1 embodiment shows an opening of three different diameters with the smallest at the bottom.

In the upper or largest diameter portion of the hole are placed washer 44 and cylindrical member 49. The washer may be omitted if the diameter of member 49 is large enough to insure that it will rest on the shoulder between the large and intermediate diameters of the hole. Rod 47 is attached to fixed collar 48 and inserted through slidable collar 51, the latter resting on member 49. Spring 53 encircles rod 47 between collars 48 and 51.

Bottom portion 45 of the hole in part 43 is preferably roughened and a small amount of solder 46, or other malleable, heat sensitive material, placed in the bottom of the hole. The solder may be placed in the hole while either hot or cold, with or without flux. Rod 47 passes loosely through member 49 and its lower end 55, shaped in an arrowlike configuration, is forced into solder 46 with spring 53 being compressed between collars 48 and 51. Solder 46 must be of a sufficient quantity to fill in around arrow 55 and be forced into the recess above the tip and engage tightly between rod 47 and the sides of bottom portion 45 of the hole. When the valve is placed in a hot environment, the solder will soften, releasing rod 47 which will be moved upwardly by spring 53 pushing against collar 48, to push ball 39 toward seat 31 the magnetic field of which will attract the ball, shutting off the fluid flow. Fixed bushing 42 is attached to rod 47 in the intermediate diameter portion of the hole. Thus, the travel of rod 47 is limited by contact of bushing 42 with washer 44. The distance of travel of the rod is such that the upper end thereof does not touch ball 39 when the latter is seated, but does extend past member 35 so the ball cannot be reset until rod 47 has been reset.

The other main improvement is the reset mechanism 23 which is screwed into the upper chamber 13. The basic elements of this mechanism are a guide 61 and rod 63. The guide is a solid cylindrical piece threaded on the top and bottom with a bore of a diameter somewhat greater than that of rod 63 drilled through its center to allow the rod to slide through it without touching the sides. The bottom portion of guide 61 screws into the top of body 11 as shown. The middle section 65 may be made hexagonal to facilitate assembly. (It will be recognized that portions of each of the various elements may be so made or may contain flats to ease assembly of the whole valve). Rod 63 slides freely through guide 61, projecting on both top and bottom. The top and bottom of guide 61 are recessed to receive spring shoulders 67 and 69, respectively. Spring 71 encircles the top of rod 63 and drilled cylindrical piece 73, with shoulder 75 containing recess 76 to hold spring 71, is secured to rod 63 with roll pin 77. A gasket 79, such as a neoprene O-ring, is placed over shoulder 75 and a hollow cylindrical member 80 (actually hexagonal on the outside) internally threaded on the bottom and having a hole in the top is screwed into guide 61 compressing the spring 71 slightly to obtain a good seal at gasket 79. A cap 81 is fastened to the top of piece 73 with roll pin 83, inserted in a blind hole in the cap, to limit downward travel.

On the bottom of rod 63 spring shoulder 69 fits into the recess in guide 61 and spring 85 encircles the rod. Spring shoulder 87 and member 89, having a recess with an O-ring gasket 91 mounted therein, are slidably inserted on rod 63. Finally, on the bottom there is permanently affixed a plunger 93 of sufficient diameter to prevent member 89 from sliding off the end of rod 63. (In actual assembly, plunger 93 would be affixed to rod 63 first, elements 89 and 87 and spring 85 placed on the rod, the rod then slide through guide 61 and spring 71 and its shoulders and member 73 placed on the rod, with cap 81 being affixed last.)

After the valve has operated to bring ball 39 in contact with seat 31, resetting is accomplished by pressing down on cap 81. In the position shown in FIG. 1 spring 85 is compressed. As rod 63 is moved downward, spring 71 is compressed and spring 85 will expand to keep member 89 against plunger 93 until throat 17 is reached by O-ring 91. The openings in shoulders 67 and 69 serve to keep rod 63 aligned as it is moved, and the recesses in guide 61 keep the shoulders centered. Thereafter, spring 85 will cause O-ring 91 to seal the passage through throat 17. Rod 63 and plunger 93 will continue to move downward, pushing ball 39 off of magnetic seat 31 until it drops to the position shown, where it will come to rest. The seal of O-ring 91 is made before that of ball 39 is broken, thus preventing fluid escape while the ball is being reset. Rod 63 is then allowed to return to its normal position from the force of spring 71. If an unsafe flow still exists ball 39 will be reseated (i.e., the valve will again be closed) upon breaking the seal of O-ring 91.

Figure 4:
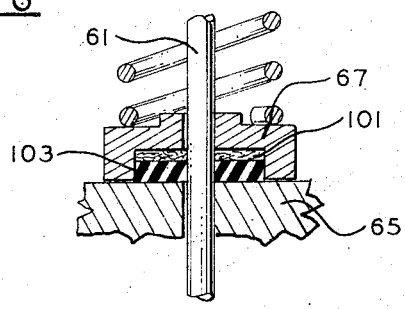
FIG. 4 is a fragmentary cross sectional view of an upper sealing means of FIG. 1.

To prevent leakage around rod 61 a unique seal is incorporated into spring shoulders 67 and 69. This is shown in detail in FIG. 4. The bottom portion of shoulder 67 is hollowed and an oil impregnated felt washer 101 inserted therein. Then there is placed in the opening a washer 103 of silicone plastic, or similar material, having a hole with a diameter less than the outer diameter or rod 61 and of an overall diameter greater than the inner diameter of the hollow. This will cause it to seal both against rod 61 and shoulder 67. The combined thickness of washers 101 and 103 is preferably slightly greater than the depth of the hollow, also to insure complete sealing.

Figure 5:
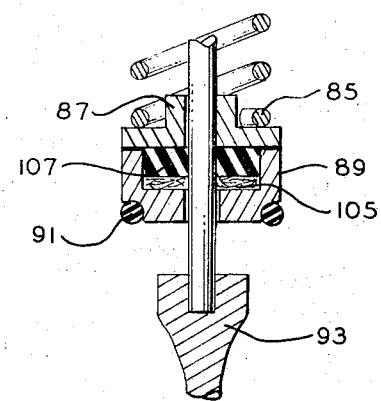
FIG. 5 is a fragmentary cross sectional view of a lower sealing means of FIG. 1.

A similar seal is provided in member 89 to avoid leakage during resetting when plunger 93 is separated from member 89. This is shown in detail in FIG. 5. Member 89 similarly has a hollow portion in which is placed a felt, oil impregnated washer 105 and a silicon washer 107. The diameters and thicknesses are again such as to insure complete sealing. In each case the oiled felt washer provides permanent lubrication.

Figures 3, 6:
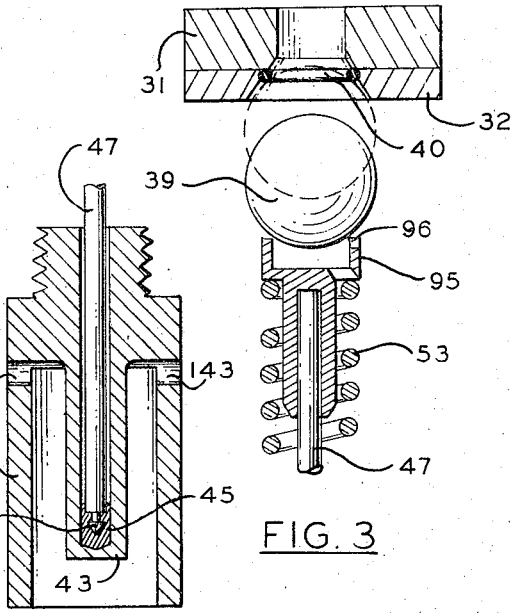
FIG. 3 is a fragmentary cross sectional view of a second means of supporting the ball.
FIG. 6 is a fragmentary cross sectional view of a second embodiment of the heat sensitive device of FIG. 1.

FIG. 3 shows an alternate method of supporting ball 39 below seal 31. A cradle 95 is slid over the top of rod 47 of the heat sensitive mechanism. The cradle will be shaped to allow flow during normal operation. When the solder melts, the cradle 95 will move with rod 47 pushing the ball toward seat 31. Operation due to tipping or excessive flow is the same as described above. The ball is supported on very small knife edge type projections 96 on cradle 95 to avoid problems of metal to metal contact such as moisture causing corrosion which could cause the ball to stick to the cradle.

A second embodiment of the heat sensitive apparatus 25 is shown in FIG. 6. For maximum heat to reach solder 46 as quickly as possible, the walls of member 43 should be as thin as allowable considering the internal pressure generated by forcing the tip of the rod into the solder. However, this causes a danger of the tip of member 43 being inadvertently broken off. In this embodiment, member 43 is formed by drilling out an interior portion of member 141 to form an enclosure which protects member 43. Holes 143 are drilled through member 141 at the upper end of the hollowed out portion to create a chimney effect and cause a good air flow over member 43, which now has thinner sides allowing it to operate more quickly. It will also be noted that the hole in which the solder is placed is of uniform diameter. Although construction is simpler than the FIG. 1 embodiment of this portion of the apparatus, operation may not be as reliable since molten solder may be drawn up the hole as the rod is moved and harden while sticking to the sides of the rod or hole. The possibility of such problems is eliminated in the FIG. 1 embodiment.

Figure 2:
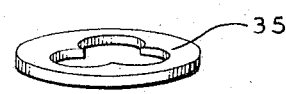
FIG. 2 is a perspective view of one embodiment of the member on which the ball of FIG. 1 rests during normal operation.

Although both the heat sensitive mechanism 25 and the reset mechanism 23 are shown to move the ball 39 by being placed respectively below and above it, either may be located to the side of the ball in a manner similar to the reset mechanism shown in FIG. 2 of my U.S. Pat. No. 3,407,827. In the case of the reset mechanism, the rod 63 and plunger 93 would be located as shown in that Figure to push the ball down. In the case of heat sensitive mechanism 25, rod 47 would be positioned to contact the ball below its center diameter and thus push it up toward the seat.

To facilitate mounting, threads 131 are placed on the outside of the upper portion of body 11. The top of the valve may then be slipped through a hole in a bracket 133 permanently attached to a heater, wall, etc., and a hex nut 135 screwed onto the body 11, to hold it in place.

In the disclosed embodiment rod 47 is held in the initial, cocked position against the bias of spring 53 by embedding tip 55 in solder 46. This may be easily accomplished by inserting a short length of cold wire solder, or some small beads of solder in the bottom portion 45 of the hole, inserting rod 47 in the opening and forcing the tip into the solder. This forces the solder into the space above the tip (i.e., around the reduced diameter portion), creating a high pressure and securely retaining the rod against the spring bias. The end of the rod above tip 55 fits more snugly in the opening and prevents the solder from flowing up further, compacting it densely around the tip. Another means of inserting solder 46 would be through a hole drilled into member 43 to communicate with bottom portion 45; a piece of wire solder could be inserted in the same manner as pin 77 as inserted to retain member 73 on rod 63, and the hole plugged.

The provision of temperature responsive valve closure means makes possible the intentional use thereof to operate the valve when desired, as well as the use in response to an undesirable overheating condition. For example, an electric heating element could easily be incorporated in or attached to element 43 with a control at some remote location. When a known leak exists, but no condition has yet occurred to cause automatic closure of the valve, the control may be actuated to close the valve by induced thermal action.

Thus, an improved automatic shut-off valve utilizing a ball and magnetic seat which is sensitive to heat, position, excess flow and vibration and which has a safer reset means has been shown. Although specific embodiments have been described, it will be evident to those skilled in the art that various modifications may be made without departing from the spirit of the invention which is intended to be solely limited by the appended claims.

What is claimed is:

1. In an automatic shut-off valve of the type wherein the valve is automatically closed by the movement of a pallet into engagement with a valve seat in response to presence of an unsafe condition, apparatus to re-set the pallet after the valve has operated comprising:
   a. a guide member having a hole axially aligned with the center of the valve seat and positioned on the side of said valve seat opposite the pallet;
   b. a rod movable in said guide member between a first and second position, said first position being spaced from the plane of the valve seat and said second position passing through said plane to force said pallet away from said seat;
   c. plunger means permanently attached to the end of said rod closest to said seat, said plunger means having a diameter less than the hole in said seat but greater than the diameter of said rod;
   d. an element slidable on said rod placed adjacent said plunger means and having sealing means inserted on the circumference of its end closest said seat, said closest end being of a diameter greater than the hole in said seat;
   e. a first spring encircling said rod between said element and said guide member;
   f. a second spring encircling said rod on the opposite side of said guide member from said first spring, and being stronger than said first spring;
   g. stop means affixed to the other end of said rod; and
   h. sealing means around said rod to prevent leakage between said rod and said guide member, said sealing means comprising a spring shoulder between said guide and said second spring, said shoulder being hollowed on the end which contacts said guide member and containing in the inner portion of said hollow an oiled felt washer and in the outer portion of said hollow a silicone washer, said silicone washer having an outer diameter greater than the size of said hollow and an inner diameter smaller than the size of said rod thereby causing sealing on its inner and outer surface.

2. The invention according to claim 1 and further including a hollow in the end of said element opposite said end having said sealing means, said hollow containing in its inner portion an oiled felt washer and in its outer portion a silicone washer having an outer diameter greater than said hollow and an inner diameter less than that of said rod and a solid spring shoulder of a diameter at least equal to that of said element placed between said element and said first spring.

3. An automatic shut-off valve which closes in response to an unsafe condition and remains closed until manually reset after the condition has been restored to normal, said valve comprising, in combination:

a. a valve body having inlet and outlet openings with a valve seat interposed therebetween;

b. a pallet movable from a normally open position to a closed position with respect to said seat to block flow therethrough in response to the presence of an unsafe condition;

c. a rod mounted for movement from an initial position axially through said valve body and having a first end portion extending outside said valve body for manual engagement to effect said movement and a second end portion positioned to engage said pallet when the latter is in its closed position upon said movement of said rod and to move said pallet back to its open position;

d. an element slidably mounted on said rod adjacent said second end portion and having a peripheral portion movable into sealing engagement with said valve seat, said element encircling said rod with a clearance therebetween;

e. a first spring biasing said element toward said second end portion of said rod, said element, second end portion, valve seat and pallet being so relatively arranged that movement of said rod against the bias of said first spring moves said element into sealing engagement of said peripheral portion with said valve seat, and continued movement of said rod against the bias of said first spring moves said second end portion into engagement with said pallet;

g. a second spring biasing said rod toward said initial position; and h. sealing means between said rod and said element allowing relative movement therebetween while preventing leakage of gas through the space providing clearance between said rod and element, said sealing means comprising a lubricated felt washer and a plastic washer each encircling and contacting the entire periphery of said rod, and each being disposed in a hollow in said element, at least said plastic washer having an outer diameter greater than that of said hollow to tightly engage the latter around its entire periphery.

4. The invention according to claim 3 wherein the combined thickness of said felt and plastic washers is greater than the depth of said hollow in said element.

5. The invention according to claim 3 and further including guide means having an opening through which said rod slidably passes between said first and second springs, and second sealing means comprising a lubricated felt washer and a plastic washer each encircling and contacting the entire periphery of said rod and each disposed in a hollow in a spring shoulder disposed between said first spring and said guide means.

6. The invention according to claim 5 and further including third sealing means comprising a lubricated felt washer and a plastic washer each encircling and contacting the entire periphery of said rod and each disposed in a hollow in a spring shoulder disposed between one end of said second spring and said guide means.

* * * * *